(12) United States Patent
Mells

(10) Patent No.: US 6,853,456 B2
(45) Date of Patent: Feb. 8, 2005

(54) METHOD AND APPARATUS FOR MEASURING A FREQUENCY OF AN OPTICAL SIGNAL

(75) Inventor: Bradley Mells, Carlsbad, CA (US)

(73) Assignee: TIP Group, LLC, Lilburn, GA (US)

( * ) Notice: Subject to any disclaimer, the term of this patent is extended or adjusted under 35 U.S.C. 154(b) by 0 days.

(21) Appl. No.: 10/062,604

(22) Filed: Jan. 31, 2002

(65) Prior Publication Data

US 2003/0142320 A1 Jul. 31, 2003

(51) Int. Cl.$^7$ ................................................. G01B 9/02
(52) U.S. Cl. ...................................... 356/484; 356/454
(58) Field of Search ................................. 356/450, 451, 356/487, 454, 519, 484; 398/204

(56) References Cited

U.S. PATENT DOCUMENTS 5,305,134 A * 4/1994 Tsushima et al. ........... 398/204

* cited by examiner

Primary Examiner—Samuel A. Turner
Assistant Examiner—Patrick Connolly
(74) Attorney, Agent, or Firm—Eliza Stefaniw (57) ABSTRACT

A method and apparatus are provided for detecting a frequency of an optical signal within a communications channel having a plurality of optical carriers separated by a predetermined frequency spacing. The method includes the steps of locking an optical carrier frequency to an axial mode of an optical resonator of known free spectral range; providing an additional optical resonator as a reference having a known free spectral range that differs from that of the first optical resonator; locking an optical reference signal to a closest axial mode of a reference optical resonator producing an optical reference signal that is spectrally offset from said optical carrier frequency by a spectral quantity less than the known free spectral range; mixing the optical carrier frequency with the reference optical signal frequency thus generating a difference signal as a beat frequency; and measuring a frequency of a difference signal.

61 Claims, 4 Drawing Sheets

METHOD AND APPARATUS FOR MEASURING A FREQUENCY OF AN OPTICAL SIGNAL

FIELD OF THE INVENTION

The field of the invention relates to communication systems and more particularly to optical communication systems.

BACKGROUND OF THE INVENTION

Methods of transmitting and receiving communications signals over fiber optic networks are known. Wavelength division multiplexing (WDM) techniques are also known in the context of optical communications systems. Such techniques have been applied to a variety of communications networks, including metropolitan local area networks, regional wide area networks and long distance communications networks. In fact wavelength division multiplexing is a standard technique used today to increase aggregate capacity in fiber optic communications systems.

The prior use of wavelength division multiplexing techniques in fiber optic networks has generally limited the spectrum utilized for the transmission signal to a small fraction of the occupied bandwidth. This approach has been effective to increase capacity by combining multiple digital signal streams on a single fiber by using a different wavelength (channel) as the carrier for each of the multiple data streams. However as the number of separate wavelengths increases, there is much economic benefit to be gained from a more efficient utilization of spectrum.

The current industry trend is to increase spectral efficiency by reducing the frequency spacing between optical carriers in the multiplexed transmission. It is not uncommon to find optical channels carrying 10 Gbps transmissions on frequency grids spaced at 100 GHz and 50 GHz frequency grids are starting to be deployed. Even at the 50 GHz frequency separation for the 10 Gbps signal, the spectral efficiency is only 0.2 bps/Hz (20%). Nevertheless it is feasible that wavelength division multiplexing technology can yield spectral efficiencies approaching 100%.

The need to improve spectral efficiency is driven by economic as well as technological reasons. This is because in general any given component technology operates over a limited bandwidth. Increased spectral efficiency optimizes the effective utilization of such limited bandwidth.

A large spectral separation between neighboring optical channels in a WDM system allows for a great deal of error in absolute frequency allocation. Typically a relatively low spectral efficiency can accommodate an optical filter that provides a flat passband over a bandwidth much greater than that of the signal. Thus the system can accommodate substantial errors in the center frequency of both laser and filter frequencies.

However as the frequency grid is made narrower, the absolute accuracy to which laser and filter center frequencies must be established and maintained becomes increasingly important to achieve reliable system performance. Furthermore, increases in spectral efficiency are fundamentally limited when the Fourier bandwidth of the signal exceeds the flat portion of the filter passband width. As these limits are reached, transmission impairments caused by frequency errors result. Therefore the accuracy and stability of the spectral components become critical performance parameters in WDM systems with high spectral efficiency.

While the use of multiple optical signals for the transmission of information through a single waveguide is an effective means to increase bandwidth, the optical output frequency of a laser is sensitive to any of a number of factors (e.g. age, temperature, etc.). Hence it is well known the laser frequency may change during its operating lifetime. Alternatively, the laser itself may fail. If the optical carrier frequency changes by too much (or if the laser fails), downstream detecting and decoding can no longer function properly in a WDM system. Therefore means to maintain laser frequency stability during the operational lifetime are required to enable deployment of closely spaced WDM systems.

Furthermore, as frequency spacing between individual optical carriers is reduced, the need arises to accurately determine the laser transmission frequency for each optical signal. The ultra-high frequency of individual optical carriers makes such frequency measurement difficult. Nevertheless, it is important to improve spectral efficiency of WDM transmissions in order to achieve the most favorable economics while increasing the bandwidth capacity of optical communications systems. Thus there is a need for a method of measuring and stabilizing the frequency of optical carriers in fiber optic systems containing large numbers of optical wavelengths.

SUMMARY

A method and apparatus are provided for establishing the absolute frequency of each optical carrier within a communications bandwidth having a plurality of optical carriers separated by a predetermined frequency spacing. The method includes the steps of locking the free spectral range of a plurality of optical resonators to a common microwave frequency and a means of locking each of the plurality of optical carrier frequencies to a particular mode of an optical resonator. The method further includes locking the free spectral range of an offset resonator to a known microwave frequency that is different from (but close to) the predetermined frequency spacing and a means of locking an optical frequency reference source to a particular mode of the offset resonator. Thus an optical interrogation signal is created and the method further provides for mixing the optical interrogation signal with the plurality of optical carriers. The difference frequency of the interrogation signal from a closest optical carrier of the plurality of optical carriers thereby identifies the mode number of said closest optical carrier mode by a Vernier effect.

DETAILED DESCRIPTION OF A PREFERRED EMBODIMENT

Figure 1:
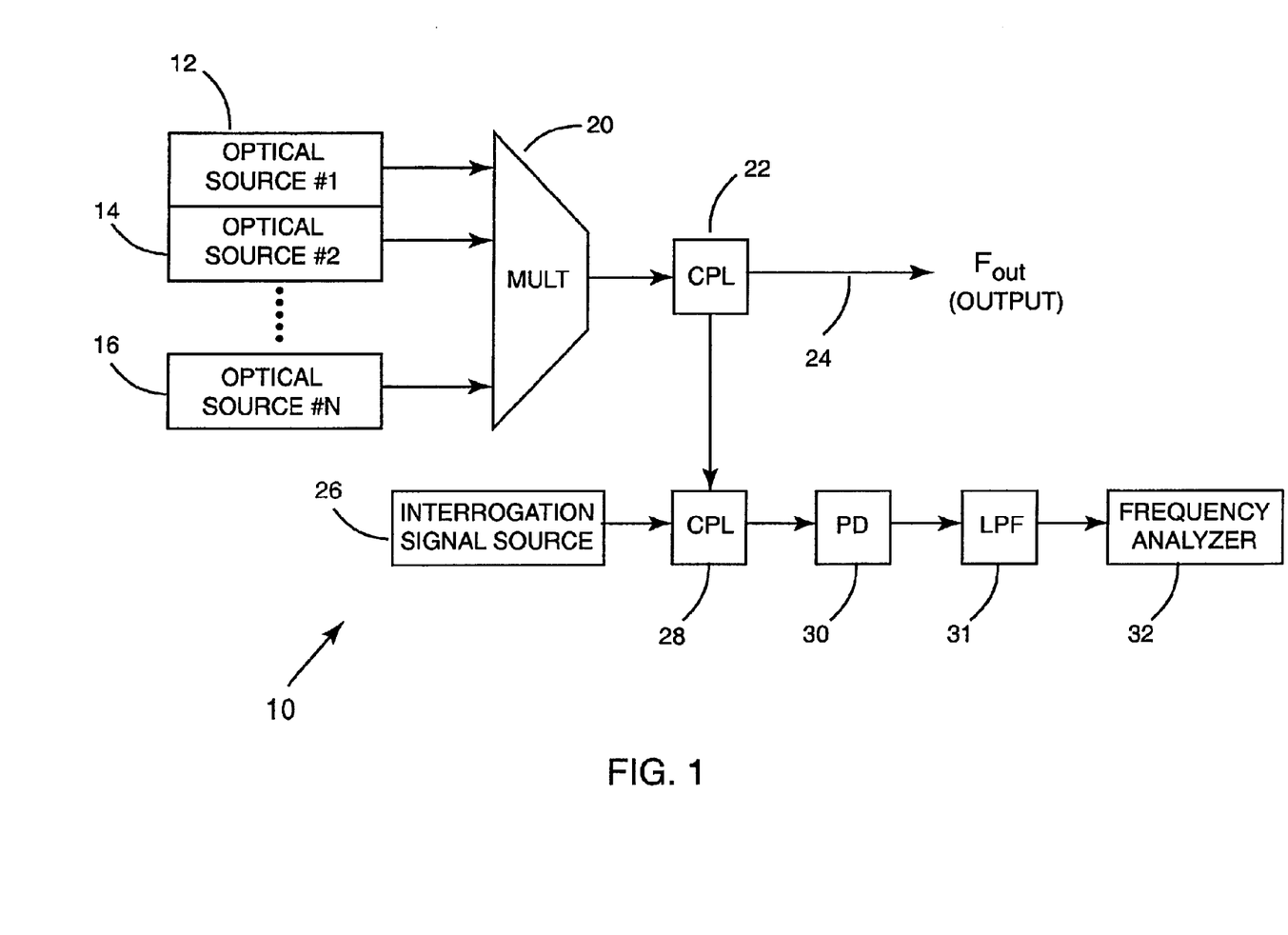
FIG. 1 is a block diagram of a system for measuring an optical carrier frequency under an illustrated embodiment of the invention.

FIG. 1 depicts a system 10 for measuring and stabilizing the frequency of each individual optical carrier component contained in an output signal $F_{out}$ comprising a plurality of optical carrier frequencies. In such an embodiment, the optical carrier frequencies may be locked to adjacent modes of a reference resonator (or to multiple reference resonators that are maintained at a common free spectral range). As shown, signals from a number of optical sources 12, 14, 16 may be combined in a multiplexing filter 20 and transferred to a user (not shown) at a remote location through an optical waveguide 24 (e.g., an optical fiber).

The optical signal generation system 10 may be one-way or two-way communications system that carries information (e.g., telephone, Internet, Intranet, Ethernet, CATV, etc.) using a number of optical carriers. The sources 12, 14, 16 may be continuous wave reference frequencies or they may be modulated in the optical communications system application. Further, the frequency measurement capabilities of the system 10 may be able to precisely measure a frequency of the optical carriers whether the carriers are continuous wave (CW) or modulated by a plurality of communications signals.

For example, the optical sources 12, 14, 16 may be transmitter components of an optical communication system that incorporates WDM techniques in a regime that supports carriers in a predetermined optical frequency range (e.g., 192–197 Tera-Hertz (THz)) and maintains adjacent carrier frequencies offset by a predetermined channel spacing defined by a particular frequency (e.g., 25 Giga-Hertz (GHz)). For example, if the system 10 of FIG. 1 were to have 4 carriers, then the carriers may be located at $f_1$=195 THz, $f_2$=195.025 THz, $f_3$=195.050 THz and $f_4$=195.075 THz. In this case, the free spectral range of the reference resonator to which each of these carriers is locked would be 25 GHz.

Under an illustrated embodiment, a portion of the output $F_{out}$ of the communication system 12, 14, 16, 20 may be diverted within a coupler 22 and combined with an optical interrogation signal from a signal source 26 by a beam combiner or coupler 28. The combined signals may then be mixed in a detector 30. The resulting difference frequencies generated thereby may be filtered by a low pass filter 31 and the beat frequency of the lowest frequency component may be determined by a microwave frequency analyzer 32 (e.g., a spectrum analyzer or frequency counter).

As used herein, an interrogation signal is an optical reference signal derived from a laser source that is tuned and locked to a particular mode of an optical reference resonator wherein the free spectral range of said resonator is offset from that of the optical reference resonator used to stabilize the plurality of source lasers. The offset frequency between the free spectral range of the source laser reference resonator and that of the interrogation signal reference resonator results in an equivalent frequency step in the optical spectrum for adjacent sets of modes of the two resonators. This produces a Vernier effect that can be used to determine the absolute mode number to which a particular carrier frequency is locked. By choosing the offset frequency to be substantially smaller than the resonator free spectral range, conditions can be readily established wherein there is no degeneracy of the difference frequency between source and interrogation signal frequencies over wide bandwidth in the optical spectrum. Thus mode numbers corresponding to stabilized optical frequencies can be determined with absolute certainty over the full bandwidth of such non-degenerate optical spectrum.

Figure 2:
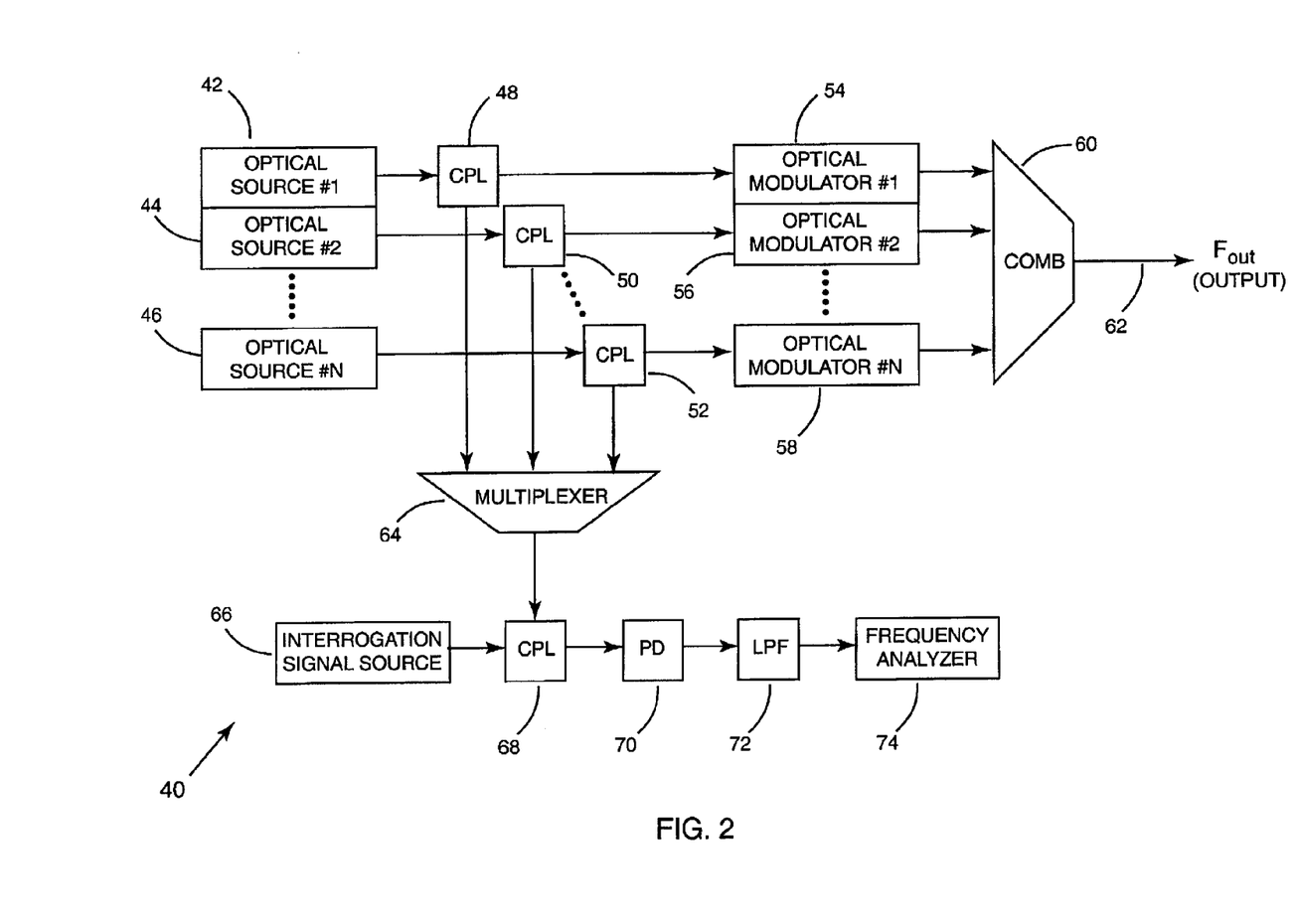
FIG. 2 is a block diagram of an optical communications system that utilizes the subject invention for actively monitoring each optical frequency contained in a WDM transmission.

FIG. 2 illustrates an embodiment of the invention wherein the source lasers are externally modulated for application to a WDM optical communications system 40 suitable for long distance fiber optic transmission applications. Such an embodiment enables the plurality of source lasers to be utilized in a communications systems while the spectral processing relative to the interrogation signal is accomplished with CW carriers. In the embodiment, a plurality of optical sources 42, 44, 46 are independently sampled by a plurality of optical couplers 48, 50, 52 prior to modulation by a plurality of external optical modulators 54, 56, 58. The modulated optical signals are thereafter combined by a WDM multiplexing filter 60 into a single optical output 62 and may thereafter be transmitted to a remote user via optical fiber or an alternate optical transmission medium.

The optical samples provided by the couplers 48, 50, 52 are combined using a WDM multiplexing filter 64 and thereafter combined with the interrogation signal source 66 in optical coupler 68. The combined optical signal containing the plurality of independent optical carrier frequency samples and the interrogation signal frequency may be mixed in photodiode 70 and the high frequency components removed by low pass filter 72. The difference frequency between neighboring optical modes of the source and interrogation signal reference resonators may be determined by a frequency analyzer 74.

The frequency space between optical carriers may be controlled by a microwave oscillator. This is accomplished by utilizing said microwave oscillator to control the free spectral range of a reference optical resonator. A method by which stabilization of the resonator free spectral range may be accomplished has been described substantially by DeVoe and Brewer.[1] Because the free spectral range of the reference optical resonator is locked to the microwave oscillator, the frequency space between optical modes that are locked to said resonator is equal to the microwave oscillator frequency.

Figure 3:
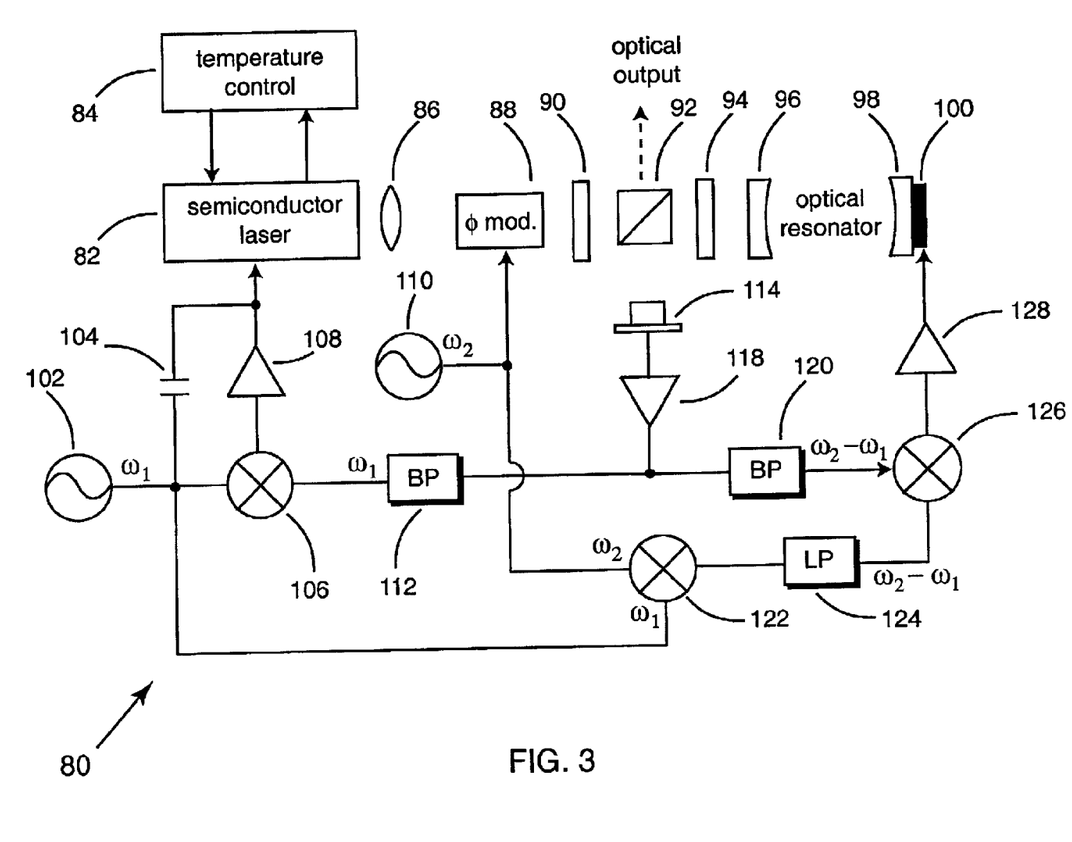
FIG. 3 depicts an optical signal generator that may be used by the system of FIGS. 1 and 2 to stabilize the free spectral range of a reference cavity and lock an optical carrier frequency to a particular mode of said reference cavity.

FIG. 3 is a block diagram of the optical signal generator (e.g. 26, 42, etc.) that may be used to generate the optical frequencies pertinent to the subject invention including the plurality of optical carriers as well as the tunable interrogation signal frequency. Included within the signal generator 26 may be a stabilized laser 82 and an actively stabilized optical resonator comprising two mirrors 96, 98. The stabilized laser 82 may be a semiconductor laser constructed substantially as described in U.S. Pat. No. 5,717,708 by the inventor of the instant application, assigned to the assignee of the instant application and incorporated herein by reference.

The optical system depicted in FIG. 3 functions by collimating the semiconductor laser output using lens 86 and passing the resulting wave through phase modulator 88. A half-wave plate 90 may be utilized to adjust the orientation of the linearly polarized light relative to a polarizing beamsplitter 92. Thus an optical output may be taken from the reflected s-polarization and the transmitted p-polarization may be utilized to derive the control signals. The combination of polarizing beamsplitter 92 and quarter-wave plate 94 functions as an optical circulator that provides isolation of the semiconductor laser from the reference resonator comprising mirrors 96, 98. The optical circulator 92, 94 also functions to direct the feedback signal comprising the optical resonator 96, 98 reflection to illuminate the photodiode 114.

The feedback circuit that stabilizes the semiconductor laser 82 to a mode of optical resonator comprising the mirrors 96, 98 functions at frequency $\omega_1$ of RF oscillator 102. Under the illustrated embodiment, frequency modulation (FM) sidebands at frequency $\omega_1$ are AC coupled by capacitor 104 and imposed upon the semiconductor laser spectrum by direct modulation of the laser injection current. The frequency $\omega_1$ is chosen to be substantially greater than the spectral width of the resonant mode of optical resonator mirrors 96, 98 so that the FM sidebands offset from the optical carrier by $\omega_1$ are completely reflected by mirror 96 when the optical carrier is at the resonant frequency of the cavity mirrors 96, 98.

The feedback loop functions by comparing the phase of FM sidebands at frequency $\omega_1$ to the frequency of the resonant optical mode via heterodyne mixing in the photodiode 114. The signal at frequency $\omega_1$ is separated from the heterodyne spectrum by bandpass filter 112. The feedback signal is derived from the phase difference between the detected optical signal at $\omega_1$ and a reference at $\omega_1$ corresponding to the low pass filtered output of double balanced mixer 106. Op-amp 108 functions as an active filter to amplify the feedback signal while scaling the frequency response of the loop. The DC coupled output of op-amp 108 is utilized to control the laser injection current.

An additional feedback circuit is provided to stabilize the free spectral range of the optical resonator by controlling the optical path length between mirrors 96, 98. The feedback circuit that stabilizes the optical distance between mirrors 96, 98 functions at the difference frequency of RF oscillators 102 and 110.

Under the illustrated embodiment, the FM sidebands at frequency $\omega_2 \pm \omega_1$ are imposed upon the semiconductor laser spectrum by the combination of the direct modulation of the laser junction current at frequency $\omega_1$ and external phase modulation by phase modulator 88 at frequency $\omega_2$. The external phase modulator 88 may function by the refractive index modulation induced via the electro-optic effect and may be fabricated using an electro-optic material such as Lithium Niobate ($LiNbO_3$).

The feedback circuit that is utilized to stabilize the free spectral range of the optical resonator 96, 98 functions by causing the optical resonator to support the resonance of the phase modulation sidebands offset from the optical carrier by angular frequency $\omega_2$. In the illustrated embodiment the error signal is derived at $\omega_2-\omega_1$ by mixing the output of oscillators 102 and 110 in double balanced mixer 122 and eliminating the sum frequency using low pass filter 124. The optical phase reference at frequency $\omega_2-\omega_1$ is separated from the spectrum that is coherently detected by photodiode 114 utilizing band pass filter 120. The phase of the coherently detected signal at $\omega_2-\omega_1$ is compared to the reference phase at $\omega_2-\omega_1$ in double balanced mixer 126 thus producing a signal suitable for feedback to stabilize the free spectral range of the optical resonator comprising mirrors 96, 98.

The DC coupled feedback signal is derived by filtering the detected optical phase at $\omega_2-\omega_1$ and comparing the detected phase to a reference phase at $\omega_2-\omega_1$ in double balanced mixer 126. The detected phase at $\omega^2-\omega_1$ is scaled and filtered by high voltage op-amp 128 resulting in a signal suitable to control the optical length of the reference resonator. The optical length between the mirrors 96, 98 may be controlled by mounting one of the cavity mirrors 98 on a piezoelectric element 100 and controlling the voltage on said piezoelectric by the DC coupled output of op-amp 128. The DC component functions to adjust a length of the resonator cavity, thereby maintaining the free spectral range of resonator precisely at the frequency $\omega_2$ corresponding to oscillator 110.

The stabilized optical reference resonator subsystem 80 may be used to generate a comb of optical reference frequencies wherein the frequency spacing between adjacent modes is determined by the free spectral range of the reference resonator 96, 98. The free spectral range of said reference resonator is actively controlled by the frequency of the microwave oscillator 110.

Under the illustrated embodiment, two microwave frequencies are utilized to control two different sets of optical reference frequencies. One such frequency determines the spectral range between adjacent optical carriers in the WDM transmission system. The other determines the set of interrogation frequencies that may be utilized to determine the absolute optical frequency of any optical carrier within the WDM spectrum.

The two microwave frequencies may be chosen so that within the optical spectrum of interest, the difference frequency between two lasers locked to a common mode number of the two reference cavities shall fall within a fraction of the WDM channel spacing. Furthermore, the difference between the two free spectral ranges shall be large enough that discrimination of adjacent mode numbers can be easily accomplished by simple microwave spectrum analysis techniques (e.g. a frequency counter).

For example, if the WDM transmission incorporates a spectral separation between adjacent channels of 25 GHz, there may be carrier signals at frequencies $f_1$=195 THz, $f_2$=195.025 THz, $f_3$=195.050 THz and $f_4$=195.075 THz. These channels would correspond to modes of an optical resonator free spectral range that is locked to a microwave frequency of precisely 25 GHz. Then the free spectral range of the resonator that determines the interrogation (reference) frequency grid may be chosen such that $f_r=\omega_2/(2\pi)$=24.999 GHz. Thus mode number 7800 corresponds to an optical frequency of 195 THz relative to the 25 GHz grid and the interrogation signal frequency would be 7800×24.999 GHz= 194.9922 THz. The difference frequency between the WDM signal at 195 THz and the interrogation signal at 194.9922 THz is 7.800 GHz. Note that this frequency is simply the product of the mode number and the difference between the free spectral of the WDM grid and that of the interrogation (reference) grid.

Similarly the next frequency corresponding to mode number 7801 would be $f_2$=195.025 THz and the interrogation frequency would be 195.017199 THz. Thus the difference frequency would be 7.801 GHz and mode number 7801 is thereby identified. Provided that the difference frequency between the free spectral range of the WDM channel separation and that of the interrogation grid is chosen to be small enough, a unique difference frequency can be established for every distinct mode number over the bandwidth of interest in the optical spectrum.

In the example considered here, the free spectral range difference is 1.0 MHz and the WDM transmission utilizes a 25 GHz grid. Full C-band coverage corresponds to difference in frequencies ranging from 7.677 to 7.838 GHz. Thus the subject invention sets up a vernier effect that will identify absolute mode numbers corresponding to optical frequencies of the WDM transmission.

Figure 4:
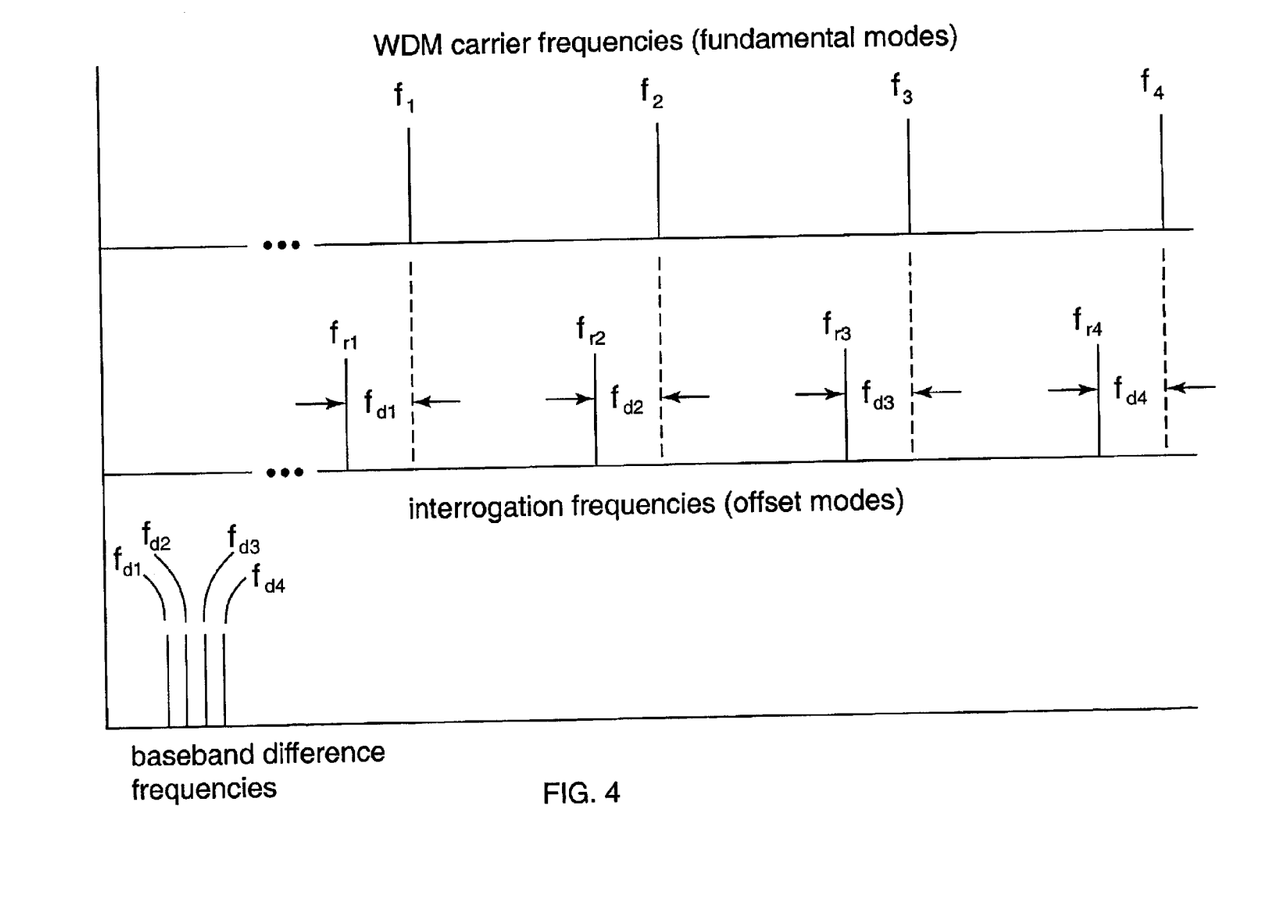
FIG. 4 shows the spectral processing that may be performed by the system of FIGS. 1 and 2 to determine and maintain absolute optical frequencies.

The interrogation signal is tuned to the modes supported by the offset reference resonator and thus used to measure the frequency of the optical carrier signals. As described above (FIG. 1), the optical carrier signals are combined with the interrogation signal in the combiner 28 and mixed in photodiode 30. A difference signal $f_d$ between an optical carrier signal and corresponding interrogation signal (i.e. the frequency of the equivalent mode number of the offset reference resonator) may then be detected and the corresponding baseband frequency will determine the frequency of the nearest optical carrier. FIG. 4 depicts the optical signal processing accomplished by the fundamental and offset resonator modes.

Mode numbers and corresponding absolute optical frequencies may be determined by mixing the interrogation signal with the optical signal to be measured. The optical signal to be measured may be the combination of signals corresponding to the WDM spectrum or it may be an individual laser to be tuned to a particular optical frequency supported by the fundamental grid. As the interrogation signal passes from the signal generator 26, it couples with the information signals 12, 14, 16 in the combiner 28. The combined signals may then be mixed in a detector 30 and the lowest beat frequency component filtered by the low pass filter 31. A frequency analyzer 32 may then determine the frequency of said beat that corresponds to an absolute mode number determination of the nearest optical carrier frequency. Because the free spectral range of the carrier grid is known, determination of the mode number also determines the absolute optical frequency.

It is worth noting that only the lowest frequency difference signals need to be detected because any other difference (or summation) signals relative to a particular interrogation signal will be at a frequency greater than that of the fundamental mode spacing. Thus one unique optical frequency is identified when the interrogation signal is tuned to a particular mode of the offset reference resonator. In this manner the lowest frequency beat always identifies the optical frequency of the nearest mode.

With the proper selection of the offset reference resonator free spectral range, the interrogation signal may be used to shift each optical carrier (and associated information signal, if applicable) to a baseband frequency that is less than the free spectral range of the fundamental reference resonator. For a mode spacing (or information bandwidth) that is more or less, the frequency of the channel offset signal may be adjusted according to the circumstances. For example, if the WDM channel separation is very small, the offset reference frequency may also be made small so that a large number of independent optical modes may be identified within a given bandwidth. It should be noted, however, that as the frequency difference between the channel spacing and offset reference frequency decreases, the resolution of the spectrum analyzer (or frequency counter) must be increased in order to provide mode number discrimination.

Conversely the frequency difference between the offset reference resonator free spectral range and that of the frequency grid may be chosen to be relatively large so that low resolution spectrum analysis techniques may be applied. Furthermore, there is no reason why the mode numbers must be matched between the interrogation signal and the nearest optical frequency to be measured. This allows a great deal of flexibility with respect to the choice of offset frequency. Although increasing the offset frequency will limit the optical bandwidth over which the technique may be applied, it greatly simplifies the implementation. Nevertheless, full C-band coverage may be realized for grids as closely spaced as 12.5 GHz with offset frequencies as high as 40 MHz. This would correspond to 300 uniquely discriminated modes over an optical bandwidth of 3.75 THz.

Further, the reference frequency may also be chosen to have a value very close to one of the information carriers. Choosing the reference frequency close to an information carrier may place the difference frequencies that provide mode number discrimination at relatively low baseband frequencies so that the frequency counter may be implemented at low frequencies. However, it is important to note that the actual frequencies at which mode number discrimination is accomplished must be chosen to be substantially greater than the bandwidth corresponding to the short term stability of the locked laser frequency. Provided that this condition is met, the accuracy of the measurement technique described herein will be limited only by said short term instabilities.

With the aid of the frequency analyzer 32, the contents of each slot may be examined, both for the presence of the carrier, and also for the information signal. Since each carrier is downshifted to a predetermined baseband frequency, there is absolute knowledge regarding which carriers are present and which may be absent.

Alternatively, the contents of individual spectral slots may be further downshifted, one at a time, to baseband. Once downshifted, an information signal of the individual spectral slots may be detected and decoded. Detecting and decoding may allow for further testing and evaluation of the integrity of the transmission system 12. Alternatively the decoded transmission may be utilized as a received signal wherein the subject invention may function as part of a coherent optical communication system.

A specific embodiment of a method and apparatus for measuring an optical carrier frequency has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of detecting a frequency of an optical signal, such method comprising the steps of:

providing an optical carrier frequency locked to an axial mode of a first optical resonator of known free spectral range;

providing a reference optical resonator having a known free spectral range that differs from that of the first optical resonator;

locking an optical reference signal to an axial mode of a reference optical resonator producing an optical reference signal that is spectrally offset from said optical carrier frequency by a spectral quantity within a predetermined bandwidth from that of the optical carrier frequency;

mixing the optical carrier frequency with the optical reference signal frequency thus generating a difference signal as a beat frequency; and measuring a frequency of a difference signal.

2. The method of detecting a frequency of an optical signal as in claim 1, further comprising locking an optical reference frequency to an axial mode of the reference optical resonator closest to that of the carrier frequency producing an optical reference signal that is spectrally offset from said optical carrier frequency by a spectral quantity less than the known free spectral range.

3. The method of detecting a frequency of an optical signal as in claim 1, further comprising defining said optical carrier signal as existing within a communications band having a plurality of optical carriers.

4. The method of detecting a frequency of an optical signal as in claim 3, further comprising measuring an optical frequency of each of the plurality of optical carriers in order to separate each spectrally adjacent optical carrier by a predetermined frequency whereas each optical carrier signal is locked an assigned axial mode of an optical resonator of known free spectral range.

5. The method of establishing a plurality of optical carriers as in claim 4 further comprising locking the plurality of optical carrier signals to a common optical resonator.

6. The method of establishing a plurality of optical carriers as in claim 4 further comprising locking the plurality of optical carrier signals to a plurality of optical resonators.

7. The method of establishing a plurality of optical carriers as in claim 6 further comprising locking the plurality of optical resonators to a common free spectral range.

8. The method of establishing a plurality of optical carriers as in claim 5 further comprising a method whereby each optical carrier is locked to an assigned axial mode of a common optical resonator whereas each assigned mode may support a mutually exclusive frequency.

9. The method of establishing a plurality of optical carriers as in claim 7 further comprising a method whereby each optical carrier is locked to an assigned axial mode of a particular resonator whereas each assigned mode may support a mutually exclusive frequency.

10. A method of detecting a frequency of an optical signal, such method comprising the steps of:

defining a carrier frequency grid whereby the frequency space between optical carriers on said grid is determined;

providing a means by which an optical carrier frequency is maintained on a carrier grid frequency;

defining a reference frequency grid whereby the frequency space between optical references on said reference grid is determined and different from that of the carrier frequency grid;

providing a means by which an optical reference signal is maintained on a reference grid frequency within a predetermined bandwidth from that of the optical carrier frequency;

mixing the optical carrier frequency with the optical reference signal frequency thus generating a difference signal as a beat frequency; and measuring a frequency of a difference signal.

11. The method of detecting a frequency of an optical signal as in claim 10 wherein the reference optical carrier is maintained on a reference grid frequency nearest that of the first optical carrier frequency.

12. The method of detecting a frequency of an optical signal as in claim 10, further comprising defining the optical carrier frequency grid as corresponding to the harmonics of a known fundamental frequency.

13. The method of detecting a frequency of an optical signal as in claim 12, further comprising defining the optical reference frequency grid as corresponding to the harmonics of a known fundamental frequency different from that of the carrier frequency grid.

14. The method of detecting a frequency of an optical signal as in claim 13, further comprising defining a fundamental difference signal as the difference between the respective fundamental frequencies of the carrier and reference grids.

15. The method of detecting a frequency of an optical signal as in claim 14, further comprising a means by which an optical carrier signal is maintained on a frequency of the optical carrier frequency grid.

16. The method of detecting a frequency of an optical signal as in claim 15, further comprising a means by which an optical reference signal is maintained on a frequency of the optical reference frequency grid within a predetermined bandwidth of the optical carrier signal frequency.

17. The method of detecting a frequency of an optical signal as in claim 16, further comprising defining the predetermined bandwidth to be less than the fundamental frequency of the carrier frequency grid.

18. The method of detecting a frequency of an optical signal as in claim 17, further comprising defining the optical carrier and reference frequencies as corresponding to the same harmonic number of their respective fundamental frequencies.

19. The method of detecting a frequency of an optical signal as in claim 16, further comprising establishing a difference frequency between respective harmonics of the optical carrier and reference frequencies such that the frequency difference between adjacent sets of such respective harmonics may vary by an integer multiple of the fundamental difference frequency.

20. The method of detecting a frequency of an optical signal as in claim 19, further comprising mixing the optical carrier frequency and optical reference frequency to generate a unique difference frequency as a Vernier succession of difference frequencies is established whereby mixing of adjacent harmonics of the optical carrier and reference frequencies respectively shall vary by one fundamental difference frequency.

21. The method of detecting a frequency of an optical signal as in claim 10, further comprising defining said optical carrier signal as existing within a communications band having a plurality of optical carriers.

22. The method of establishing a plurality of optical carriers as in claim 21, further comprising defining the optical carrier frequency grid as corresponding to the harmonics of a known fundamental frequency.

23. The method of establishing a plurality of optical carriers as in claim 22, further comprising defining the optical reference frequency grid as corresponding to the harmonics of a known fundamental frequency different from that of the carrier frequency grid.

24. The method of establishing a plurality of optical carriers as in claim 23, further comprising defining a fundamental difference signal as the difference between the respective fundamental frequencies of the carrier and reference grids.

25. The method of establishing a plurality of optical carriers as in claim 24, further comprising generating a plurality of harmonics of the fundamental frequency of the carrier frequency grid.

26. The method of establishing a plurality of optical carriers as in claim 25, further comprising a means by which an optical reference signal may be tuned to a frequency of the optical reference frequency grid within a predetermined bandwidth of an optical carrier signal frequency.

27. The method of establishing a plurality of optical carriers as in claim 26, further comprising defining the predetermined bandwidth to be less than the fundamental frequency of the carrier frequency grid.

28. The method of establishing a plurality of optical carriers as in claim 27, further comprising defining the optical carrier and reference frequencies as corresponding to the same harmonic number of their respective fundamental frequencies.

29. The method of establishing a plurality of optical carriers as in claim 26, further comprising establishing a difference frequency between respective harmonics of the optical carrier and reference frequencies such that the frequency difference between adjacent sets of such respective harmonics may vary by an integer multiple of the fundamental difference frequency.

30. The method of establishing a plurality of optical carriers as in claim 29, further comprising mixing an optical carrier frequency and optical reference frequency to generate a unique difference frequency as a Vernier succession of difference frequencies is established whereby mixing of adjacent harmonics of the optical carrier and reference frequencies respectively shall vary by one fundamental difference frequency.

31. The method of detecting a frequency of an optical signal as in claim 1 wherein the step of locking an optical frequency to an axial mode of an optical resonator further comprises phase modulating the optical frequency at a frequency corresponding to a known free spectral range.

32. The method of detecting a frequency of an optical signal as in claim 31, further comprising resonating the phase modulation sidebands within an optical resonator.

33. The method of detecting a frequency of an optical signal as in claim 32, further comprising phase modulation of the optical carrier frequency at a second frequency that is not resonant within the resonator of known free spectral range.

34. The method of detecting a frequency of an optical signal as in claim 33, further comprising detecting the phase of the resonant phase modulation sideband signal.

35. The method of detecting a frequency of an optical signal as in claim 34, further comprising detecting the heterodyne beat at the difference frequency between the resonant and non-resonant phase modulation sideband components.

36. The method of detecting a frequency of an optical signal as in claim 35 further comprising detecting the phase of the heterodyne beat frequency by mixing said beat frequency with the difference frequency between the resonant and non-resonant phase modulated sideband components in orthogonal phase within a mixer.

37. The method of detecting a frequency of an optical signal as in claim 36, further comprising feedback of the mixer output corresponding to the detected phase of the heterodyne beat frequency to control a resonant frequency of the optical resonator.

38. The method of detecting a frequency of an optical signal as in claim 37, further comprising defining said optical carrier signal as existing within a communications band having a plurality of optical carriers.

39. A method of detecting a frequency of an optical signal within a communications band having a plurality of optical carriers separated by a predetermined fundamental frequency, such method comprising the steps of:
providing a reference optical signal spectrally offset from an optical carrier of the plurality of optical carriers by a spectral quantity within a predetermined bandwidth;
mixing the reference optical signal with the plurality of optical carriers;
detecting the difference frequency between the reference optical signal and a closest optical carrier frequency as a heterodyne beat frequency; and
measuring a frequency of a heterodyne beat signal.

40. The method of detecting a frequency of an optical signal as in claim 39, further comprising providing a reference optical signal spectrally offset from a closest optical carrier of the plurality of optical carriers by a spectral quantity less than the predetermined fundamental frequency.

41. The method of detecting a frequency of an optical signal as in claim 39, further comprising generating the spectrally offset reference optical signal.

42. The method of detecting a frequency of an optical signal as in claim 41 wherein generating the spectrally offset reference optical signal further comprises phase modulating the reference signal with the frequency corresponding to the free spectral range of a reference optical resonator that supports the plurality of spectrally offset reference optical signals.

43. The method of detecting a frequency of an optical signal as in claim 42, further comprising reasonating the carrier and phase modulation sidebands of the reference optical signal.

44. The method of detecting a frequency of an optical signal as in claim 43, further comprising detecting the resonated phase modulation sidebands of the reference optical signal.

45. The method of detecting a frequency of an optical signal as in claim 44, further comprising phase modulation of the optical carrier frequency at a second frequency that is not resonant within the resonator of known free spectral range.

46. The method of detecting a frequency of an optical signal as in claim 45, further comprising detecting the phase of the resonant phase modulation sideband signal.

47. The method of detecting a frequency of an optical signal as in claim 46, further comprising detecting the heterodyne beat at the difference frequency between the resonant and non-resonant phase modulation sideband components.

48. The method of detecting a frequency of an optical signal as in claim 47, further comprising detecting the phase of the heterodyne beat frequency by mixing said beat frequency with the difference frequency between the resonant and non-resonant phase modulated sideband components in orthogonal phase within a mixer.

49. The method of detecting a frequency of an optical signal as in claim 48, further comprising feedback of the mixer output corresponding to the detected phase of the heterodyne beat frequency to control a resonant frequency of the optical resonator.

50. The method of detecting a frequency of an optical signal as in claim 49, further comprising controlling a resonant frequency of the resonator using the detected mixed phase modulated reference frequency and resonant phase modulation sideband frequency.

51. The method of detecting a frequency of an optical signal as in claim 50, further comprising generating the plurality of optical carrier signal frequencies.

52. An apparatus for detecting a frequency of an optical signal within a communications channel having a plurality of optical carriers separated by a predetermined frequency spacing, such apparatus comprising:
a stabilized laser that provides a reference optical signal spectrally offset from an optical carrier of the plurality of optical carriers by a spectral quantity within a predetermined bandwidth;
a photodetector that mixes the reference optical signal with the plurality of optical carrier frequencies to create a heterodyne beat frequency with a closest optical carrier frequency; and
an analyzer adapted to measure a frequency of a heterodyne beat signal.

53. The apparatus for detecting a frequency of an optical signal as in claim 52, further comprising the predetermined bandwidth being less than the fundamental frequency of an optical resonator of the stabilized laser.

54. The apparatus for detecting a frequency of an optical signal as in claim 53, further comprising optical carrier and reference frequencies corresponding to the same harmonic number of their respective fundamental frequencies.

55. The apparatus for detecting a frequency of an optical signal as in claim 52, further comprising a resonator adapted to generate the harmonics of the free spectral range as a series of spectrally offset reference optical frequencies.

56. The apparatus for detecting a frequency of an optical signal as in claim 55, further comprising a phase modulator adapted to phase modulate the reference signal with the free spectral range frequency.

57. The apparatus for detecting a frequency of an optical signal as in claim 56, further comprising a detector adapted to detect the phase of the resonant phase modulation sideband of the reference optical signal.

58. The apparatus for detecting a frequency of an optical signal as in claim 57, further comprising feedback of the detected phase of the resonant phase modulation sideband to control a resonant frequency of an optical resonator.

59. The apparatus for detecting a frequency of an optical signal as in claim 58, further comprising a piezo-electric crystal disposed on an end of the resonator adapted to control a resonant frequency of the resonator using the detected phase of the resonant phase modulation sideband.

60. The apparatus for detecting a frequency of an optical signal as in claim 58, further comprising an electro-optic crystal contained within the resonator adapted to control a resonant frequency of the resonator using the detected phase of the resonant phase modulation sideband.

61. The apparatus for detecting a frequency of an optical signal as in claim 58, further comprising a thermally sensitive material contained within the resonator adapted to control a resonant frequency of the resonator using the detected phase of the resonant phase modulation sideband.

* * * * *